United States Patent
Joyce et al.

(10) Patent No.: US 8,971,916 B1
(45) Date of Patent: Mar. 3, 2015

(54) LOCATING A DATA STORAGE SYSTEM

(75) Inventors: Scott E. Joyce, Foxboro, MA (US); Bruce R. Rabe, Dedham, MA (US)

(73) Assignee: EMC Corporation, Hopkinton, MA (US)

(*) Notice: Subject to any disclaimer, the term of this patent is extended or adjusted under 35 U.S.C. 154(b) by 477 days.

(21) Appl. No.: 13/315,573

(22) Filed: Dec. 9, 2011

(51) Int. Cl.
*H04W 24/00* (2009.01)

(52) U.S. Cl.
USPC ............ 455/456.1; 455/456.2; 455/41.2

(58) Field of Classification Search
CPC ................. H04W 64/00; H04W 64/003
USPC ................. 455/456.1, 456.2, 41.2, 41.1
See application file for complete search history.

(56) References Cited

U.S. PATENT DOCUMENTS

| | | | |
|---|---|---|---|
| 7,379,920 B2* | 5/2008 | Leung et al. | 705/67 |
| 8,429,347 B2* | 4/2013 | Contino et al. | 711/115 |
| 2004/0054923 A1* | 3/2004 | Seago et al. | 713/201 |
| 2007/0123286 A1* | 5/2007 | Mock et al. | 455/518 |
| 2010/0049744 A1* | 2/2010 | Zhao | 707/104.1 |
| 2011/0171978 A1* | 7/2011 | Konno | 455/456.4 |
| 2012/0023293 A1* | 1/2012 | Contino et al. | 711/115 |
| 2012/0071087 A1* | 3/2012 | Griffin et al. | 455/41.1 |
| 2012/0094597 A1* | 4/2012 | Tysowski | 455/41.1 |

* cited by examiner

*Primary Examiner* — April G Gonzales
(74) *Attorney, Agent, or Firm* — Krishnendu Gupta; Jason A. Reyes

(57) ABSTRACT

A method and system for use in locating a data storage system is disclosed. A mobile portable device transmits an activating signal to the data storage system via a wireless communications network. The activating signal transmitted by the mobile portable device is received in the data storage system. The data storage system outputs a readily identifiable human perceptible signal in response to receiving the activating signal in the data storage system. The human perceptible signal facilitates identification of the location of the data storage system.

18 Claims, 4 Drawing Sheets

LOCATING A DATA STORAGE SYSTEM

TECHNICAL FIELD

The invention relates to locating a data storage system.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used. In a common implementation, a Storage Area Network (SAN) is used to connect computing devices with a large number of storage devices. Management and modeling programs may be used to manage these complex computing environments, which may be, include, or be included in a data center.

A data center refers to processing functionality for performing one or more prescribed processing tasks. In one common application, for example, a provider may use a data center to implement any kind of network-accessible service (such as an Email service, search service, and so on). In some cases, the provider may use a specially designed computer room within a general purpose facility to implement the data center. For a particularly large-scale service, the provider may devote one or more separate facilities to implement the data center.

It will be appreciated that in recent time such data centers have grown substantially in size. It will be known that such modern data centers may comprise a plurality of data center equipment such as data storage systems. For example, the data center may comprise hundreds or thousands of discrete data storage systems.

SUMMARY OF THE INVENTION

A method and system for use in locating a data storage system is disclosed. A mobile portable device transmits an activating signal to the data storage system via a wireless communications network. The activating signal transmitted by the mobile portable device is received in the data storage system. The data storage system outputs a readily identifiable human perceptible signal in response to receiving the activating signal in the data storage system. The human perceptible signal facilitates identification of the location of the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described below is a technique for use in locating a data storage system. If an individual has the co-ordinates of the location of a data storage system the individual may use global positioning system (hereinafter "GPS") on a mobile device to locate the general area of the data storage system.

However, it may occasionally be difficult to locate the data storage system as most GPS receivers are accurate only to within three to fifteen meters. Therefore, the GPS allows an individual to get a general sense only of the location of the data storage system.

The technique as described herein allows the individual within a specific range to use a mobile application to automatically interact with the data storage system so that the data storage system may output an indicator such as flashing LEDs. In addition to this feature, the technique can support the ability to upload or create a floor plan that would provide directions around obstacles.

Figure 1:
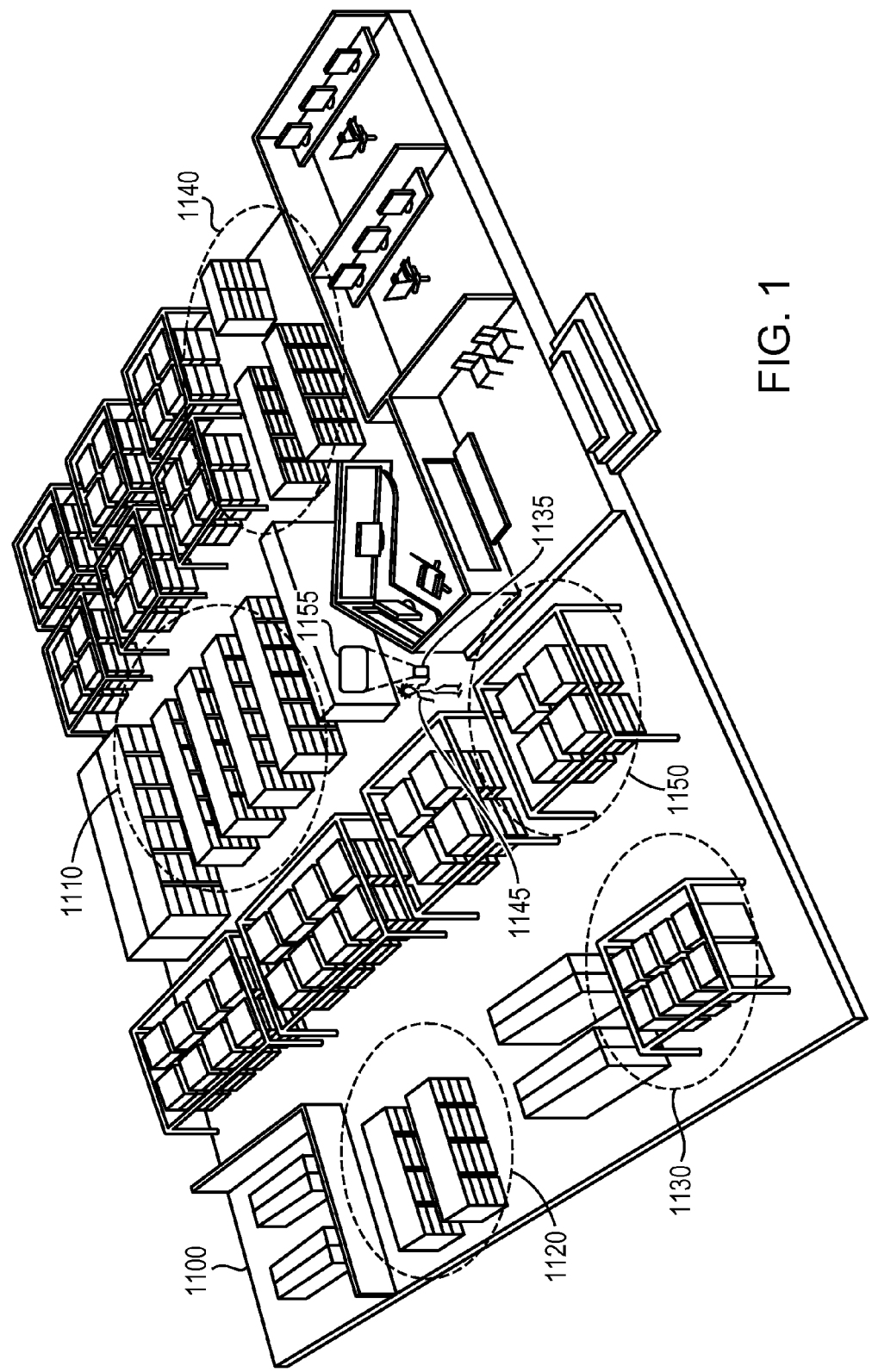
FIG. 1 illustrates an example of a data center that may be used with the technique described herein.

Referring to FIG. 1, there is illustrated an example of an embodiment of a computer system that may be used in connection with performing the technique described herein. A data center 1100 may include zones 1110, 1120, 1130, 1140, and 1150 with each zone representing a grouping of storage component and/or a different type of data storage or processing. For example, the zone 1150 may represent data processing or servers for virtual machines and the zone 1110 may represent data storage systems. There is also illustrated an individual 1145 using a mobile portable computing device 1135 in accordance with the technique as described herein to locate a data storage system 1155 in the data center 1100. The technique will be described in further detail below.

Figure 2:
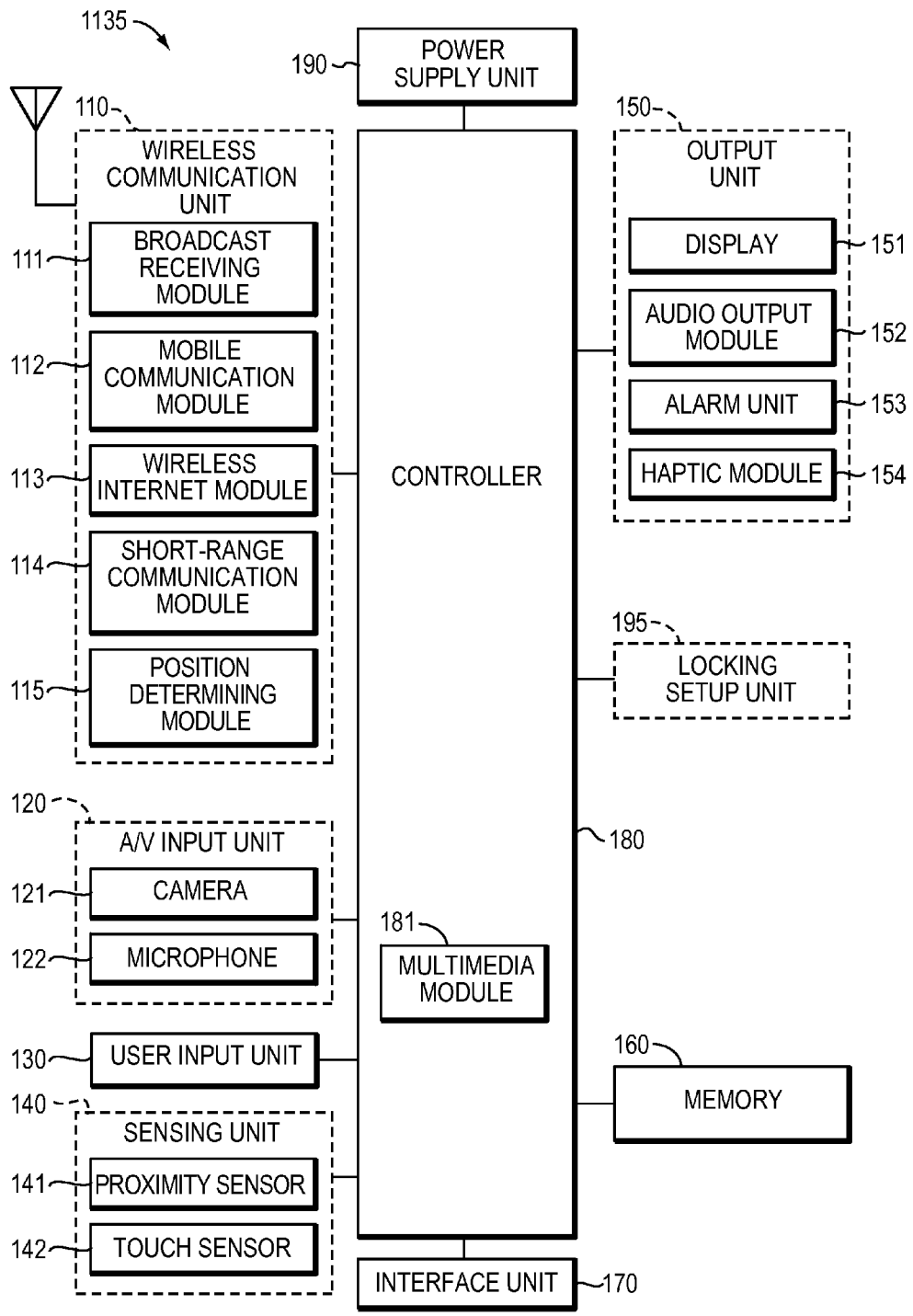
FIG. 2 is a block diagrams of an example device and system that may be used with the technique described herein.

Referring to FIG. 2, there is illustrated a block diagram of the mobile portable computing device 1135 according to one example embodiment. The device 1135 may include a mobile phone, a smart phone, a laptop computer, a digital broadcast terminal, a personal digital assistant (PDA), a portable multimedia player (PMP), a navigation system and/or the like. The device 1135 may comprise a wireless communication unit 110, an A/V (audio/video) input unit 120, a user input unit 130, a sensing unit 140, an output unit 150 having a display 151, a memory 160, an interface unit 170, a controller 180, a power supply unit 190, a locking set-up unit 195 and the like. The figure illustrates the device 1135 having various components, although all the illustrated components may not be a requirement. It will be appreciated that greater or fewer components may alternatively be implemented.

The wireless communication unit 110 may include one or more components that permit wireless communication between the device 1135 and a wireless communication system or network within which device 1135 is located. For example, the wireless communication unit 110 may include a broadcast receiving module 111, a mobile communication module 112, a wireless Internet module 113, a short-range communication module 114, a position determining module 115 and/or the like. The broadcast receiving module 111 may receive a broadcast signal and/or broadcast associated information from an external broadcast managing server via a broadcast channel, and the broadcast signal and/or broadcast associated information received by the broadcast receiving module 111 may be stored in a suitable device, such as the memory 160. The mobile communication module 112 may transmit/receive wireless signals to/from one or more network entities (e.g., base station, external terminal, server, etc.). The wireless Internet module 113 may support Internet access for the device 1135. This module may be internally or externally coupled to the device 1135. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc. The short-range communication module 114 may facilitate relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few. The position determining module 115 may identify or otherwise obtain the location or position of the device 1135. This module may be a GPS module.

The audio/video (A/V) input unit 120 may provide audio or video signal inputs to the device 1135. The A/V input unit 120 may include a camera 121 and a microphone 122. The camera 121 may receive and process image frames of still pictures or videos that are obtained by an image sensor in a video call mode or a photograph mode. The processed image frames may be displayed on the display 151. The image frames processed by the camera 121 may be stored in the memory 160 or may be externally transmitted via the wireless communication unit 110. It will be appreciated that two or more cameras 121 may be provided to the device 1135 based on environment of usage. The microphone 122 may receive an external audio signal while the device 1135 is in a particular mode, such as phone call mode, a recording mode and/or a voice recognition mode. The audio signal may be processed and converted into electric audio data. The processed audio data may be transformed into a format transmittable to a mobile communication base station via the mobile communication module 112 in case of a call mode. The microphone 122 may include noise removing algorithms (or noise canceling algorithms) to remove or reduce noise generated in the course of receiving the external audio signal.

The user input unit 130 may generate input data responsive to user manipulation of an associated input device or devices. For example, the device may include a keypad, a dome switch, a touchpad (e.g., static pressure/capacitance), a jog wheel, a jog switch, and the like.

The sensing unit 140 may provide sensing signals for controlling operations of the device 1135 using status measurements of various aspects of the device 1135. For example, the sensing unit 140 may detect an open/close status of the device 1135, relative positioning of components (e.g., a display and a keypad) of the device 1135, a position change of the device 1135 or a component of the device 1135, a presence or an absence of user contact with the device 1135, orientation or acceleration/deceleration of the device 1135. For example, the device 1135 may be configured as a slide-type mobile terminal. The sensing unit 140 may sense whether a sliding portion of the device 1135 is open or closed. Other such examples may include the sensing unit 140 sensing presence or absence of power provided by the power supply 190, presence or absence of a coupling or other connection between the interface unit 170 and an external device. The sensing unit 140 may include a proximity sensor 141 and a touch sensor 142.

The output unit 150 may generate outputs perceptible to the senses such as sight, hearing, touch and the like. The output unit 150 may include the display 151, an audio output module 152, an alarm 153 and a haptic module 154. The display 151 may visually display (i.e., output) information associated with the device 1135. For example, if the device 1135 is operated in a phone call mode, the display 151 may provide a user interface (UI) or a graphical user interface (GUI) that includes information associated with placing, conducting, and/or terminating a phone call. If the device 1135 is in a video call mode or a photograph mode, the display 151 may additionally or alternatively display information associated with these modes. The display 151 may be implemented using known display technologies including, for example, a liquid crystal display (LCD), a thin film transistor-liquid crystal display (TFT-LCD), an organic light-emitting diode display (OLED), a flexible display and a three-dimensional (3-D) display. The device 1135 may include one or more such displays. Some of the displays may be implemented in a transparent or optical transmittive type that can be called a transparent display. A transparent OLED (or TOLED) may be an example of the transparent display. The display 151 may also be implemented as the optical transmittive type. In this configuration, a user may see an object in rear of a terminal body via an area occupied by the display 151 of the terminal body. It will be appreciated that at least two displays 151 may be provided on the device 1135 based on the configuration of the device 1135. For example, a plurality of displays may be arranged on a single face of the device 1135 by being spaced apart from each other or by being built in one body. A plurality of displays may be arranged on different faces of the device 1135.

In a case where the display 151 and the touch sensor 142 for detecting a touch action are configured in a mutual layer structure (hereinafter "a touch screen"), the display 151 may be used as an input device as well as an output device. The touch sensor 142 may be configured as a touch film, a touch sheet, a touchpad and/or the like. The touch sensor 142 may convert a pressure applied to a specific portion of the display 151 or a variation of a capacitance generated from a specific portion of the display 151 to an electric input signal. The touch sensor 142 may detect a pressure of a touch as well as a touched position or size. A separate pressure sensor may detect pressure of the touch. If a touch input is provided to the touch sensor 142, signal(s) corresponding to the touch may be transferred to a touch controller. The touch controller may process the signal(s) and then transfer the processed signal(s) to the controller 180. The controller 180 may determine whether a prescribed portion of the display 151 is touched.

The proximity sensor 141 may also be provided to an internal area of the device 1135 enclosed by the touch screen and/or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have longer durability than a contact type sensor and may also have a wider utility than the contact type sensor. The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touch screen includes the electrostatic capacity proximity sensor, the proximity of a pointer may be detected using a variation of electric field according to proximity of the pointer. The touch screen (i.e., touch sensor) may be classified as the proximity sensor 141. In the following description, an action in which a pointer approaches without contacting the touch screen may be called a proximity touch. An action in which a pointer actually touches the touch screen may be called a contact touch. The meaning of the position on the touch screen proximity-touched by the pointer may define a position of the pointer that vertically opposes the touch screen when the pointer performs the proximity touch. The proximity sensor 141 may detect a proximity touch and a proximity touch pattern (e.g., a proximity touch distance, a proximity touch duration, a proximity touch position, a proximity touch shift state, etc.). Information corresponding to the detected proximity touch action and the detected proximity touch pattern may be outputted to the touch screen.

The audio output module 152 may function in various modes including a call-receiving mode, a call-placing mode, a recording mode, a voice recognition mode, a broadcast reception mode and/or the like to output audio data that is received from the wireless communication unit 110 or is stored in the memory 160. During operation, the audio output module 152 may output an audio signal relating to a particular function (e.g., a call received, a message received, etc.). The audio output module 152 may be implemented using one or more speakers, buzzers, other audio producing devices, and/or combinations thereof.

The alarm 153 may output a signal for announcing an occurrence of a particular event associated with the device 1135. Events may include a call received event, a message received event and a touch input received event. The alarm 153 may output a signal for announcing the event occurrence by way of vibration as well as video or audio signal. The video or audio signal may be outputted via the display 151 or the audio output unit 152. The display 151 or the audio output module 152 may be regarded as a part of the alarm 153.

The haptic module 154 may generate various tactile effects that can be sensed by a user. Vibration may be a representative one of the tactile effects generated by the haptic module 154. Strength and pattern of the vibration generated by the haptic module 154 may be controllable. For example, different vibrations may be outputted by being combined (or synthesized) together or may be outputted in sequence. The haptic module 154 may generate various tactile effects as well as vibrations. For example, the haptic module 154 may generate an effect attributed to the arrangement of pins vertically moving against a contact skin surface, an effect attributed to injection/suction power of air through an injection/suction hole, an effect attributed to a skim over a skin surface, an effect attributed to a contact with an electrode, an effect attributed to an electrostatic force, an effect attributed to representation of warm/cold sense using an endothermic or exothermic device and/or the like. The haptic module 154 may enable a user to sense a tactile effect through a muscle sense of a finger, an arm or the like as well as to transfer the tactile effect through a direct contact. At least two haptic modules 154 may be provided on the device 1135 based on a corresponding configuration type of the device 1135.

The memory 160 may store programs for operating the controller 180. The memory 160 may temporarily store input/output data such as phonebook data, message data, still image, and/or moving image. Data for various patterns of vibration and/or sound outputted in case of a touch input to the touch screen may be stored in the memory 160. The memory 160 may be implemented using any type or combination of suitable volatile and non-volatile memories or storage devices including a hard disk, a random access memory (RAM), a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, a multimedia card micro type memory, a card-type memory (e.g., SD memory, XD memory, etc.) and/or other similar memory or data storage device.

The interface unit 170 may couple the device 1135 with external devices. The interface unit 170 may receive data from the external devices or may be supplied with power and then transfer the data or power to respective elements of the device 1135 or enable data within the device 1135 to be transferred to the external devices. For example, when the device 1135 is connected to an external cradle, the interface unit 170 may become a passage for supplying the device 1135 with power from the cradle or a passage for delivering various command signals inputted from the cradle by a user to the device 1135. The interface unit 170 may also be configured using a wired/wireless headset port, an external charger port, a wired/wireless data port, a memory card port, a port for coupling to a device having an identity module, audio input/output ports, video input/output ports, an earphone port and/or the like. The identity module may be a chip for storing various kinds of information for authenticating a use authority of the device 1135 and may include a User Identify Module (UIM), a Subscriber Identify Module (SIM), a Universal Subscriber Identity Module (USIM) and/or the like. A device having an identity module (hereinafter "identity device") may be manufactured as a smart card. The identity device may be connectable to the device 1135 via a relevant port.

The controller 180 may control overall operations of the device 1135. For example, the controller 180 may perform control and processing associated with voice calls, data communications, video calls, etc. The controller 180 may include a multimedia module 181 that provides multimedia playback. The multimedia module 181 may be configured as part of the controller 180, or may be implemented as a separate component. The controller 180 may have a time counting function. The controller 180 may also perform a pattern recognizing process for recognizing a writing input or a picture drawing input carried out on the touch screen as characters or images, respectively.

It will be appreciated that the power supply unit 190 may provide a power required by various components of the device 1135. The power may be internal power, external power, and/or a combination thereof.

It will also be appreciated that embodiments may be implemented in a computer-readable medium using, for example, computer software, hardware, and/or some combination thereof. For hardware implementation, embodiments may be implemented using one or more applications of specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, and/or a selective combination thereof. Embodiments may also be implemented by the controller 180. For software implementation, embodiments may be implemented with separate software modules, such as procedures and functions, each of which may perform one or more of the functions and operations described herein. The software codes may be implemented with a software application written in any suitable programming language and may be stored in the memory 160, and executed by a controller or a processor, such as the controller 180.

Figure 3A:
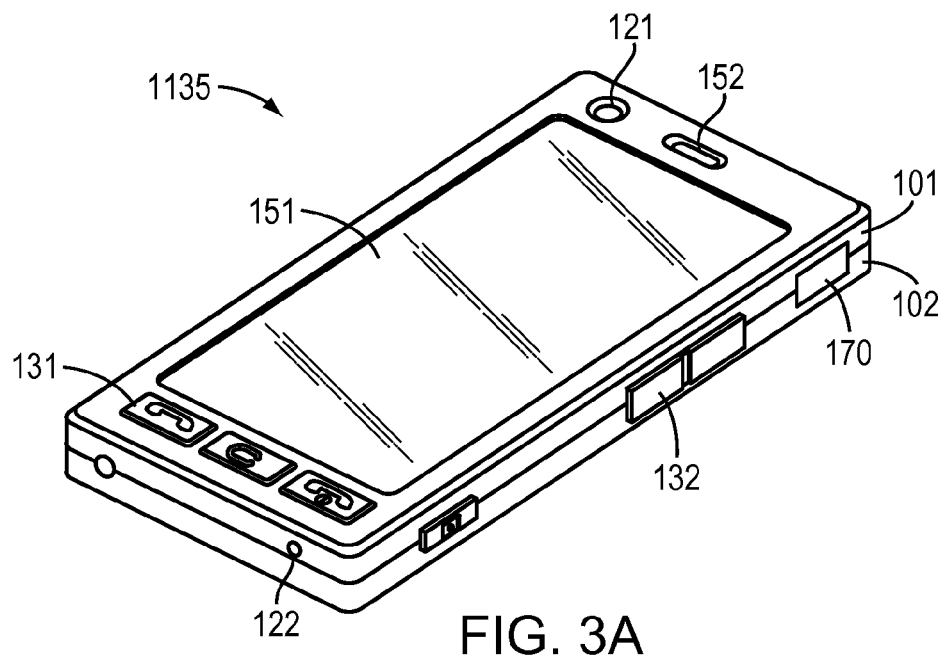
FIG. 3A is a perspective diagram of a front of the example device of FIG. 2.

Referring to FIG. 3A, there is illustrated a front view of a device 1135 according to an example embodiment. It will be appreciated that other embodiments, arrangements and configurations may also be provided. The device 1135 may have a bar type terminal body. Embodiments of the device 1135 may be implemented in a variety of other configurations. Examples of such configurations may include a folder-type, a slide-type, a bar-type, a rotational-type, a swing-type and/or combinations thereof. The body may include a case (e.g., a casing, a housing, a cover) that form an exterior of the device. The case may be divided into a front case 101 and a rear case 102. The various electric/electronic parts may be provided in a space between the front case 101 and the rear case 102. The display 151, the audio output unit 152, the camera 121, the user input unit 130 (including first and second manipulation units 131, 132), the microphone 122, the interface unit 170 and the like may be provided on the device body. The display 151 may occupy most of a main face of the front case 101. The audio output module 152 and the camera 121 may be provided at an area adjacent to one end portion of the display 151, while the first manipulation unit 131 and the microphone 122 may be provided at another area adjacent to the other end portion of the display 151. The second manipulation unit 132 and the interface unit 170 may be provided on lateral sides of the front and rear cases 101 and 102.

The user input unit 130 may receive a command for controlling an operation of the device 1135. The user input unit 130 may include the first and second manipulating units 131 and 132. The first and second manipulating units 131 and 132 may be called a manipulating portion and may adopt any mechanism of a tactile manner that enables a user to perform a manipulation action. Content inputted by the first manipulating unit 131 or the second manipulating unit 132 may be diversely set. For example, a command such as a start, an end, a scroll and/or the like may be inputted to the first manipulating unit 131. A command for a volume adjustment of sound outputted from the audio output unit 152, a command for a switching to a touch recognizing mode of the display 151 and/or the like may be inputted to the second manipulating unit 132.

Figure 3B:
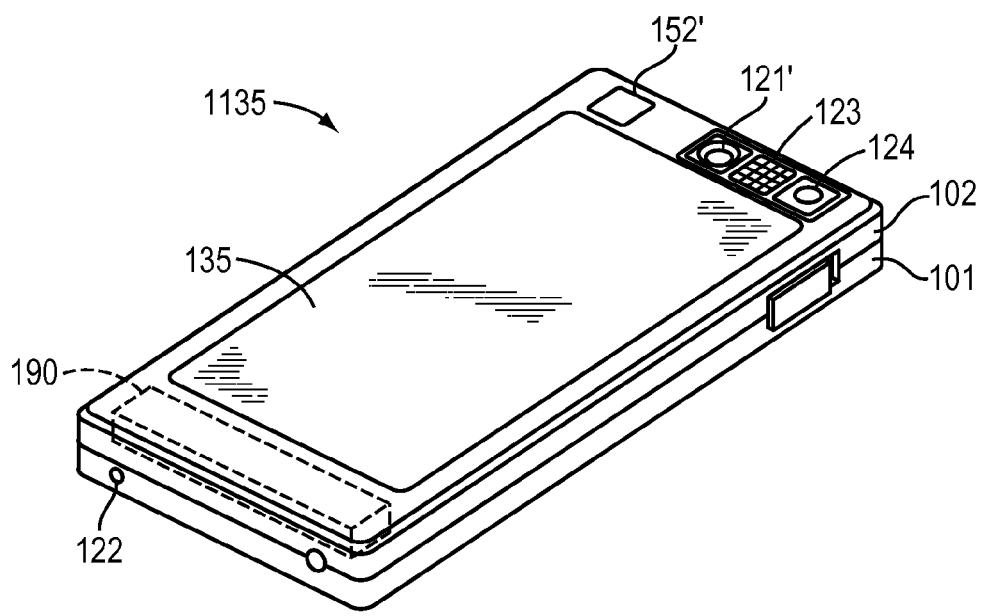
FIG. 3B is a perspective diagram of a backside of the example device of FIG. 2.

Referring to FIG. 3B, there is illustrated a view of a backside of the device shown in FIG. 3A. It will be appreciated that other embodiments, arrangements and configurations may also be provided. A camera 121' may be additionally provided on a backside of the device body, and more particularly on the rear case 102. The camera 121' may have a photographing direction that is substantially opposite to a photographing direction of the camera 121 and may have pixels differing from pixels of the camera 121. For example, the camera 121 may have a lower number of pixels to capture and transmit a picture of a user face for a video call, while the camera 121' may have a greater number of pixels for capturing a general subject for photography without transmitting the captured subject. Each of the cameras 121 and 121' may be provided on the device body to be rotated and/or popped up. A flash 123 and a mirror 124 may be additionally provided adjacent to the camera 121'. The flash 123 may project light toward a subject in case of photographing the subject using the camera 121'. If a user attempts to take a picture of the user (i.e., self-photography) using the camera 121', the minor 124 may enable the user to view a user face reflected by the minor 124. An additional audio output unit 152' may be provided on a backside of the device body. The additional audio output unit 152' may implement a stereo function together with the audio output unit 152 and may be used for implementation of a speakerphone mode in talking over the device 1135. A broadcast signal receiving antenna (not shown) may be additionally provided at the lateral side of the device body as well as an antenna for communication or the like. The antenna may be considered as a portion of the broadcast receiving module 111 and/or may be retractably provided on the device body. The power supply unit 190 for supplying a power to the device 1135 may be provided with respect to the device body. The power supply unit 190 may be built within the device body. Alternatively, the power supply unit 190 may be detachably connected to the device body. The figure also illustrates a touchpad 135 for detecting a touch that is additionally provided on the rear case 102. The touchpad 135 may be configured as a light transmittive type. If the display 151 outputs visual information from both faces, the display 151 may also recognize visual information via the touchpad 135. The information outputted from both of the faces may be controlled by the touchpad 135.

Figure 4:
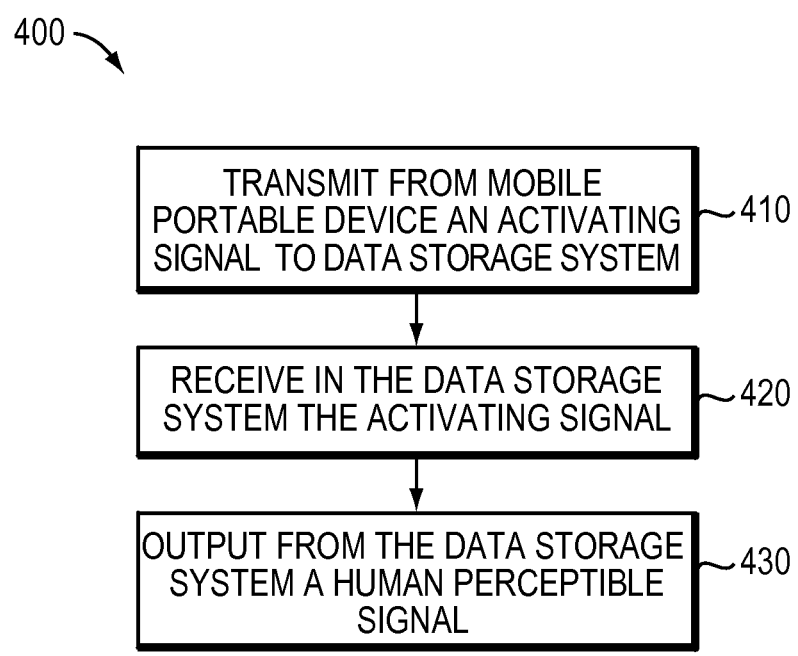
FIG. 4 is a flowchart of processing steps that may be performed in an embodiment in accordance with techniques described herein.

Referring to FIG. 4, there is illustrated a technique 400 for use in locating a data storage system. For example, the data storage system may be the data storage system 1155 located in the data center 1100 as illustrated in FIG. 1. It will be appreciated that the technique may be suitable for use in locating the data storage system 1155 in the data center 1100. The technique comprises transmitting 410 from a mobile portable device an activating signal to the data storage system via a wireless communications network. It will be appreciated from the foregoing figures that the mobile portable device may be the device 1135 as described above. It will also be appreciated that the device 1135 may transmit the activating signal using the wireless communication unit 110. For example, the mobile communication module 112 within the unit 110 may transmit a wireless signal to the data storage system. Alternatively, the short-range communication module 114 within the unit 110 may transmit the activating signal facilitating relatively short-range communication between the device 1135 and the data storage system. It will be known by those skilled in the art that technologies for implementing the short-range communication module may include radio frequency identification (RFID), infrared data association (IrDA), ultra-wideband (UWB), as well as the networking technologies commonly referred to as Bluetooth and ZigBee, to name a few. The technique comprises receiving 420 in the data storage system the activating signal transmitted by the mobile portable device. It will be appreciated that the data storage system may comprise a receiver for receiving the activating signal transmitted by the mobile portable device. It will also be appreciated that the activating signal transmitted by the device may comprise a signal indicative of the identity of the mobile portable device such that the identity of the device can be identified. In such a scenario, the data storage system may receive the signal as well as confirming the identity of the mobile portable device from which the signal has been transmitted. Additionally, the technique comprises outputting 430 from the data storage system a readily identifiable human perceptible signal in response to receiving the activating signal in the data storage system. It will be appreciated the technique may output the human perceptible signal in response to receiving the signal and confirming the identity of the mobile portable device. The human perceptible signal may facilitate identification of the location of the data storage system in the data center. It will be appreciated that the human perceptible signal may be a visual signal, for example, a light signal. In one embodiment, the light signal may flash intermittently such that an individual seeking the data storage system may be able to locate the system. For example, the light signal may be outputted on one or more LED located on or local to the data storage system. It will be appreciated that the data storage system may be configured to operate the at least one LED for a defined period of time for indicating the location of the data storage system. Alternatively, the data storage system may output the human perceptible signal as an audio signal. The audio signal may be outputted on a speaker for a defined period of time for indicating the location of the data storage system. It will also be appreciated in other embodiments the human perceptible signal may be outputted by the data storage system until the user of the mobile portable device selectively switches the signal off. For example, the user may use the device to switch the signal off or manually operate a switch on the system in order to switch the signal off.

It will be appreciated that an individual may store the co-ordinates of the location of the data storage system. In such a scenario, the device 1135 as described above may be able to locate the general area of location of the data storage system. For example, the device 1135 may use the position determining module 115 in the device 1135 to locate the general area in which the data storage system is located. However, a position determining module such as a GPS module may not be able to locate the exact location of the data storage system. A GPS module may typically locate the data storage system to within three to fifteen meters. If a data center contains a plurality of data storage systems it may be time consuming to locate the data storage system as it may be necessary to distinguish between one data storage system and another similar data storage system relatively close to the data storage system of interest. The mobile communication module 112 or the short-range communication module 114 within the unit 110 of the device 1135 may provide a quick solution by transmitting an activating signal to the data storage system. The data storage system may be configured to output a human perceptible signal in response to receiving the activating signal. The human perceptible signal may be a flashing light or a sound readily discernible by an individual so as to assist in locating the exact location of the data storage system. The technique has advantages such as saving an individual time locating the data storage system. For example, the individual may have to perform firmware upgrades in connection with a plurality of data storage systems in a data center. The aggregate time saved locating each data storage system may be considerable by using the above technique. The technique may also save administrative work recording the exact location of the data storage system.

It will also be appreciated that the technique described herein could be used with various other techniques for locating the data storage system. For example, a user could create or upload an image of a floor plan to the mobile device or to a management server accessible to the mobile device. The floor plan may be the layout of the building floor in which the data storage system is located. If the user is aware of the co-ordinates or the like of the data storage system, the user may locate the general area of the data storage system by virtue of the floor plan and the position determining module in the mobile device. It will be appreciated that the floor plan could be used together with the mobile device and the position determining module to determine directions from the users current location to a particular storage system by heuristics, for example, don't walk through walls, go through certain doors, don't walk through desks or racks. When the user gets to the general area of the data storage system the user may implement the technique described herein such that the data storage system may output a human perceptible signal for facilitating identification of the location of the data storage system.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:
1. A method, comprising:
  receiving, by a data storage system, an activating signal, wherein the data storage system comprises data storage devices;
  outputting, by the data storage system, a readily identifiable human perceptible signal in response to receiving the activating signal, wherein the human perceptible signal facilitates identification of the location of the data storage system; and in response to a selective action by a user, switching off the readily identifiable human perceptible signal.

2. The method as claimed in claim 1, wherein the human perceptible signal is outputted as a light signal.

3. The method as claimed in claim 1, wherein the human perceptible signal is outputted as a light signal flashing intermittently.

4. The method as claimed in claim 1, wherein the human perceptible signal is outputted as a light signal on at least one LED.

5. The method as claimed in claim 4, wherein the at least one LED is located on the data storage system.

6. The method as claimed in claim 1, wherein the human perceptible signal is outputted as an audio signal on a speaker.

7. The method as claimed in claim 1, wherein the mobile portable device transmits an activating signal with the assistance of a mobile communication module in the device.

8. The method as claimed in claim 1, wherein the mobile portable device transmits an activating signal with the assistance of a short-range communication module in the device.

9. The method as claimed in claim 1, wherein the mobile portable device transmits an activating signal comprising a signal indicative of the identity of the device such that the data storage system can determine the identity of the device.

10. A system, comprising:

first logic receiving, by a data storage system, an activating signal, wherein the data storage system comprises data storage devices;

second logic outputting, by the data storage system, a readily identifiable human perceptible signal in response to receiving the activating signal, wherein the human perceptible signal facilitates identification of the location of the data storage system; and in response to a selective action by a user, third logic switching off the readily identifiable human perceptible signal.

11. The system as claimed in claim 10, wherein the human perceptible signal is outputted as a light signal.

12. The system as claimed in claim 10, wherein the human perceptible signal is outputted as a light signal flashing intermittently.

13. The system as claimed in claim 10, wherein the human perceptible signal is outputted as a light signal on at least one LED.

14. The system as claimed in claim 13, wherein the at least one LED is located on the data storage system.

15. The system as claimed in claim 10, wherein the human perceptible signal is outputted as an audio signal on a speaker.

16. The system as claimed in claim 10, wherein the mobile portable device transmits an activating signal with the assistance of a mobile communication module in the device.

17. The system as claimed in claim 10, wherein the mobile portable device transmits an activating signal with the assistance of a short-range communication module in the device.

18. The system as claimed in claim 10, wherein the mobile portable device transmits an activating signal comprising a signal indicative of the identity of the device such that the data storage system can determine the identity of the device.

\* \* \* \* \*